(12) United States Patent
Schreiter et al.

(10) Patent No.: US 12,738,844 B2
(45) Date of Patent: Sep. 15, 2026

(54) CONVERSION UNIT INCLUDING A PERMISSION SIGNAL

(71) Applicant: Robert Bosch GmbH, Stuttgart (DE)

(72) Inventors: Marco Schreiter, Dresden (DE); Steffen Ritzmann, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 190 days.

(21) Appl. No.: 18/636,443

(22) Filed: Apr. 16, 2024

(65) Prior Publication Data

US 2024/0364216 A1 Oct. 31, 2024

(30) Foreign Application Priority Data

Apr. 27, 2023 (DE) ..................... 10 2023 203 899.4

(51) Int. Cl.
*H02M 3/156* (2006.01)
*H02M 1/00* (2007.01)
*H02M 3/158* (2006.01)

(52) U.S. Cl.
CPC ......... *H02M 3/156* (2013.01); *H02M 1/0025* (2021.05); *H02M 3/1584* (2013.01)

(58) Field of Classification Search
CPC ...... H02M 3/158; H02M 1/08; H02M 1/0058; H02M 1/0025; H02M 3/1584–1586; H02M 1/0043
See application file for complete search history.

(56) References Cited

U.S. PATENT DOCUMENTS 9,407,147 B2 * 8/2016 Lee ..................... H02M 3/1584
10,103,632 B2 * 10/2018 Nien ................... H02M 3/1584
10,250,122 B2 * 4/2019 Chen ..................... H02M 3/156
11,621,640 B2 4/2023 Huang et al.
12,027,966 B2 * 7/2024 Yang .................. H02M 1/0025
2005/0083024 A1 4/2005 Harris et al.
2011/0254531 A1 * 10/2011 Markowski ............. H02J 1/102 323/371
2019/0190279 A1 * 6/2019 Xu ...................... H02J 7/00712
2021/0028704 A1 * 1/2021 Jiang .................. H02M 3/1584

FOREIGN PATENT DOCUMENTS

CN 102185479 A * 9/2011

* cited by examiner

*Primary Examiner* — Sisay G Tiku
(74) *Attorney, Agent, or Firm* — NORTON ROSE FULBRIGHT US LLP

(57) ABSTRACT

A conversion unit for decreasing an input voltage into an output voltage. The conversion unit includes a step-down converter circuit with at least two voltage inputs for the input voltage, at least two control units, wherein each control unit is assigned to a voltage input, wherein each control unit is configured, upon receipt of a time signal, to output a switch signal to apply the input voltage to the assigned voltage input, and, upon receipt of a reset signal, to reset the switch signal, to receive the switch signal of another control unit, and, upon receipt, to reset a permission signal, to output the switch signal only if the permission signal is reset, and to provide the permission signal when the switch signal is output.

10 Claims, 4 Drawing Sheets

1
2
3a
3b
4a
4b
5a
5b
6a
6b
15a
15b
"1"
CLK1
CLK2
D Q
R
ON1
ON2
VIN
IL1
IL2
L1
L2
RSHUNT1
RSHUNT2
VRESET
VCSX1
VCSX2
RESET1
RESET2
VEAMP
gm
VREF
RLOAD
VOUT
COUT
RC
CC

CLK1
CLK2
CLK3
ON1
M1
RESET1
R1
ON2
M2
RESET2
R2
ON3
M3
RESET3
R3
1
2
3
1
2
3

CONVERSION UNIT INCLUDING A PERMISSION SIGNAL

CROSS REFERENCE

The present application claims the benefit under 35 U.S.C. § 119 of German Patent Application No. DE 10 2023 203 899.4 filed on Apr. 27, 2023, which is expressly incorporated herein by reference in its entirety.

FIELD

The present invention relates to a conversion unit for decreasing an input voltage into an output voltage. The conversion unit is preferably designed to be multi-phase.

BACKGROUND INFORMATION

Conversion units are described in the related art. An exemplary conversion unit 1 with two phases is shown in FIG. 1. The conversion unit 1 comprises a step-down converter circuit 2, which is designed to be two-phase, wherein each phase is provided for converting an input voltage VIN into an output voltage $V_{OUT}$. Thus, a first voltage input 4*a* and a second voltage input 4*b* are present. A respective control unit 3*a*, 3*b* is assigned to each voltage input 4*a*, 4*b*. The control units 3*a*, 3*b* are D flip-flops, which output a switch signal ON1, ON2 on the basis of a time signal CLK1, CLK2. The switch signal ON1, ON2 controls an input switch unit 5*a*, 5*b*, by means of which the respective input voltage VIN is applicable to the voltage input 4*a*, 4*b*. The inversion of the switch signal ON1, ON2 controls a reference switch 6*a*, 6*b*, by means of which a reference voltage, in particular a ground, is applicable to the voltage input 4*a*, 4*b*.

Per phase, the step-down converter circuit 2 has an inductance L1, L2 as well as a capacitance $C_{OUT}$ in order to carry out the step-down conversion. The output voltage $V_{OUT}$ is applicable to a load, represented here by the resistance $R_{LOAD}$.

Each control unit 3*a*, 3*b* can be reset by means of a respective reset signal RESET1, RESET2. The reset signals RESET1, RESET2 are generated by a respective PWM comparator 15*a*, 15*b*, wherein the inputs of the PWM comparator 15*a*, 15*b* are formed by an error amplifier output VEAMP of an error amplifier $g_m$ and by an output VCSX1, VCSX2. Depending on the switch signal ON1, ON2, the output VCSX1, VCSX2 is either a reset voltage $V_{RESET}$ or the output of a current measurement by means of a shunt resistor $R_{SHUNT1}$, $R_{SHUNT2}$ of the output current. The error amplifier $g_m$ has the output voltage $V_{OUT}$ as well as a reference voltage $V_{REF}$ as inputs.

With very short switch-on times of the phases, which each start with a rising edge of the respective time signal CLK1, CLK2 and end with RESET1=high or RESET2=high, the switching-on of the phases can be prevented at any point in time by regulating the error amplifier output VEAMP to below a $V_{RESET}$ threshold. Such short switch-on times usually occur during a soft start, i.e., the target value of the output voltage is ramped up slowly. However, even after reaching the target value, the switch-on time can be shorter than a technically specified minimum switch-on time.

As a result of beats in the time curve of the VEAMP, an imbalance can arise, in the case of which only one or no longer all phases present is/are being switched on. In the phases that are no longer switched on, the coil current can drop sharply into the negative range as a result, which must be compensated by the still active phases with increased positive coil current. This leads to a reduction in the electrical power efficiency overall. Furthermore, additional unforeseeable frequency components occur, which differ from the specification by CLK1, CLK2 and may pose a problem with regard to electromagnetic compatibility.

SUMMARY

The conversion unit according to the present invention allows for reliable switching of all phases. In particular, a negative coil current is prevented from arising due to a switching of phases being skipped. Rather, it is achieved that all phases are switched in a specified order. This increases electrical power efficiency.

According to an example embodiment of the present invention, the conversion unit for decreasing an input voltage into an output voltage comprises a step-down converter circuit and at least two control units. The step-down converter circuit comprises at least two voltage inputs for the input voltage. A control unit is assigned to each voltage input. The step-down converter circuit is thus multi-phase, wherein a phase of the step-down converter circuit is controllable by a respective control unit.

Each control unit is configured to output a switch signal upon receipt of a time signal. The switch signal achieves that the input voltage is applied to the assigned voltage input. Furthermore, each control unit is designed to reset the switch signal upon receipt of a reset signal. This represents the usual functionality that conventional control units carry out. Additionally, each control unit is designed to receive the switch signal of another control unit and, upon receipt, to reset a permission signal. The other control unit from which the switch signal is received is such a control unit that controls a preceding phase. Coupling the control units in this way achieves that the control units can switch only in a specified order. For this purpose, each control unit is designed to output the switch signal only if the permission signal is reset, and to provide the permission signal when the switch signal is output.

If a preceding phase is not switched, for example due to the aforementioned problems, the switch signal is not set and, as a result, the permission signal for the subsequent phase is also not reset. In other words, the control unit of the subsequent phase cannot receive the switch signal, as a result of which the subsequent phase is also not switched. The specified order is thus reliably maintainable.

Preferred developments and example embodiments of the present invention are disclosed herein.

Preferably, according to an example embodiment of the present invention, each control unit is designed to use the switch signal to cause an input switch unit to apply the input voltage to the assigned voltage input. The input switch unit is a transistor, for example. Preferably, the input switch unit is part of the step-down converter circuit. In particular, the switch signal is used to switch the input switch unit to a conductive state in order to apply the input voltage to the voltage input.

Preferably, according to an example embodiment of the present invention, each control unit is designed to use the inverted switch signal to cause a reference switch unit to apply a reference voltage to the assigned voltage input. The reference switch unit is a transistor, for example. Preferably, the reference switch unit is part of the step-down converter circuit. In particular, the inverted switch signal is used to switch the reference switch unit to a conductive state in order to apply the reference voltage to the voltage input. The reference voltage is in particular ground. Using the inverted switch signal ensures that the reference voltage is applied whenever the corresponding phase is not to be switched, which is represented by the reset switch signal. If the switch signal is reset, the inverted switch signal becomes logical 1.

Preferably, according to an example embodiment of the present invention, each control unit comprises a first D flip-flop and a second D flip-flop. It is provided that the first D flip-flop is designed to output the switch signal upon receipt of the time signal at a dynamic input. The second D flip-flop is designed to provide the permission signal upon receipt of the switch signal and to reset the permission signal upon receipt of the switch signal from another control unit. The first D flip-flop is thus used for handling the time signal and the corresponding response thereto. The second D flip-flop is used for handling the permission signal. The provision of the switch signal by the first D flip-flop can thus be prevented by the second D flip-flop even if the time signal provides for the provision of the switch signal. The second D flip-flop thus makes it possible to maintain the specified order of the switching of the phases.

Particularly preferably, according to an example embodiment of the present invention, the first D flip-flop comprises a reset input to which a resetting signal is outputtable. The resetting signal is provided by an OR gate, wherein the reset signal and an output of a NOR gate are transmittable as inputs to the OR gate. The first D flip-flop can thus be reset by the reset signal, as already possible in the related art. Additionally, the OR gate makes it possible to incorporate a further logic, which is present as a result of the NOR gate and the second D flip-flop. This further logic is based on the permission signal and has the goal of maintaining the provided order of the switching of the phases. The switch signal and the inverted permission signal are transmittable as inputs to the NOR gate. If the permission signal is present and the switch signal is reset, the output of the NOR gate is logical 1. The first D flip-flop thus remains reset. This state is only canceled by resetting the permission signal. Since this takes place by the switch signal of the preceding phase, it is ensured that the specified switching order of the phases is maintained.

Preferably, according to an example embodiment of the present invention, the second D flip-flop comprises a reset input. The switch signal of the other control unit is applicable to the reset input. The reset input of the second D flip-flop is thus connected to the output of the first D flip-flop of the other control unit. A connection between the control units is therefore provided in order to reset the permission signal for the subsequent phase at the same time as the switch signal is output.

According to an example embodiment of the present invention, the control unit is preferably designed to apply the switch signal to a dynamic input of the second D flip-flop. The provision of the permission signal thus takes place when the switch signal is present. In other words, the permission signal is always provided at the same time as the switch signal. Outputting a switch signal again is thus prevented until the permission signal is reset.

According to an example embodiment of the present invention, it is particularly advantageously provided for respective data inputs of the first D flip-flop and/or of the second D flip-flop to be logical 1. This logical 1 is thus also adopted at the respective output if this is specified by the dynamic input of the respective D flip-flop. This in particular makes it possible for the first D flip-flop to output the switch signal when the time signal is present, and for the second D flip-flop to output the permission signal when the switch signal is present. This can only be prevented by the corresponding reset inputs.

According to an example embodiment of the present invention, preferably, a buffer is arranged between the second D flip-flop and the first D flip-flop. The buffer delays the transmission of the switch signal to the second D flip-flop. This avoids unstable behavior of the conversion unit.

The present invention also relates to an integrated circuit. The integrated circuit comprises a conversion unit as described above. In particular, the integrated circuit is used to control driver assistance systems of vehicles.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
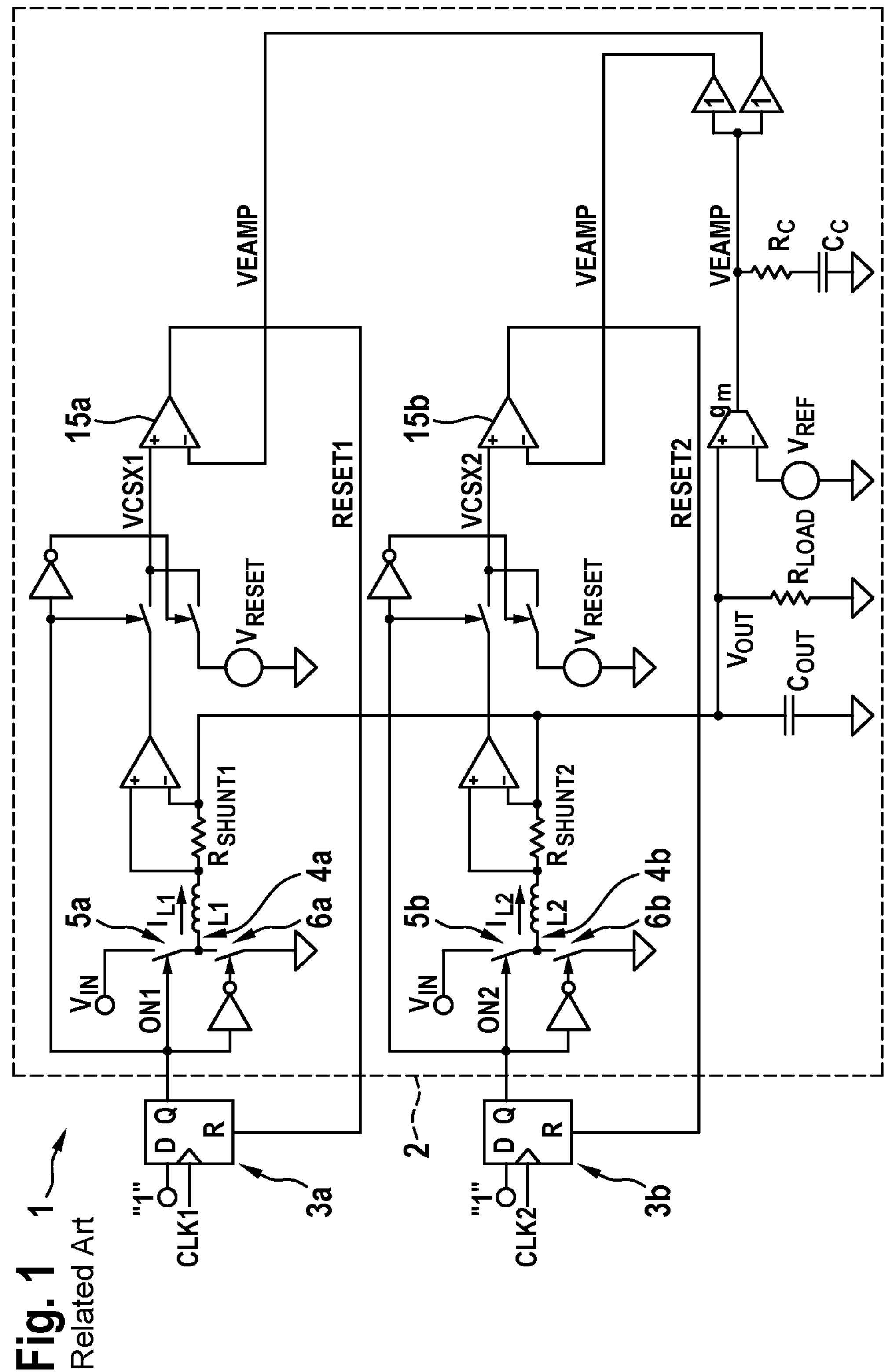
FIG. 1 shows a schematic view of a conversion unit according to the related art.
Figure 2:
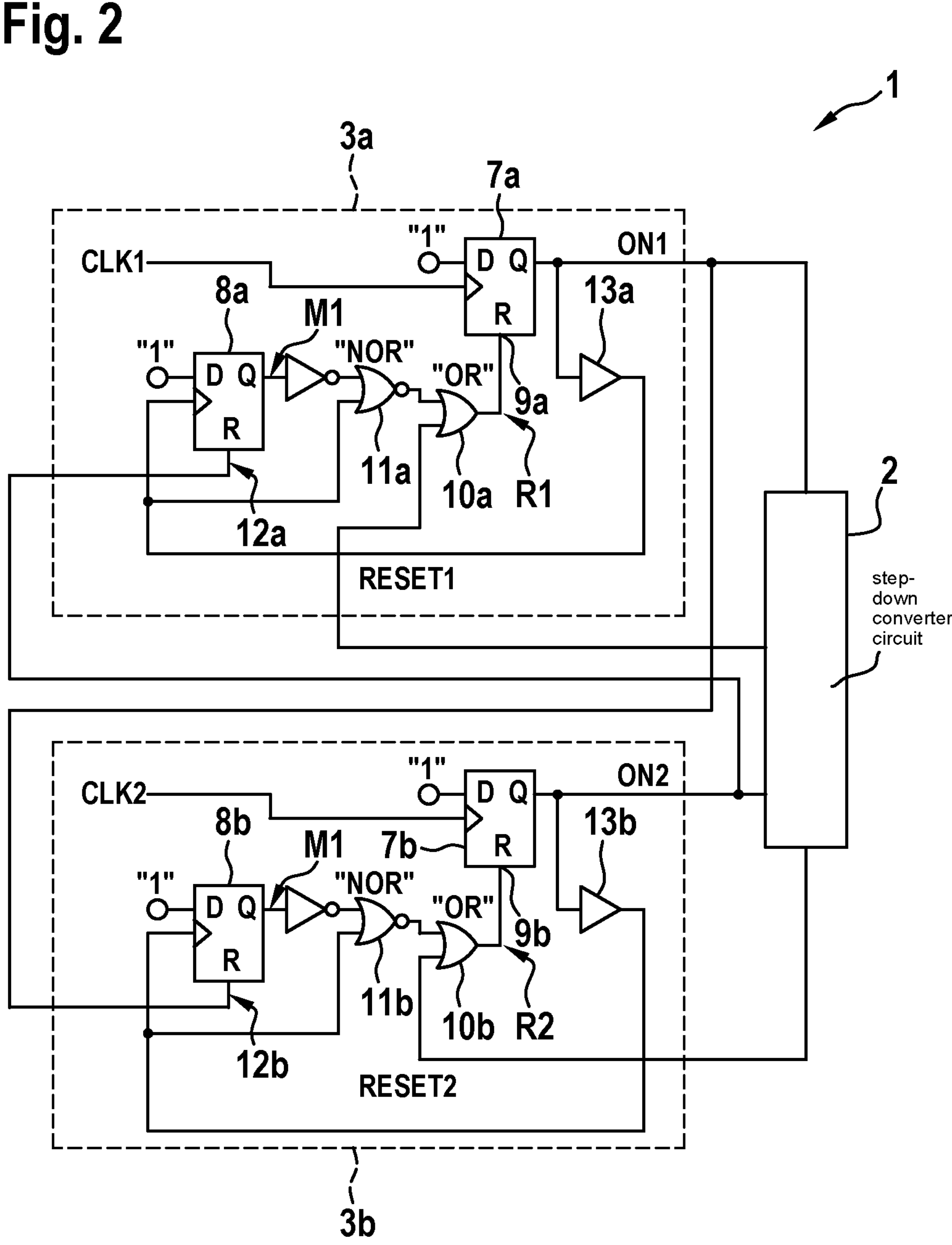
FIG. 2 shows a schematic view of a conversion unit according to an exemplary embodiment of the present invention.

FIG. 2 schematically shows a conversion unit 1 according to an exemplary embodiment of the present invention. In this example, a two-phase conversion unit 1 is shown. The conversion unit 1 differs from the conventional two-phase conversion unit shown in FIG. 1 only by the respective control units 3*a*, 3*b* of the voltage inputs 4*a*, 4*b* of the conversion unit. In particular, the multi-phase step-down converter circuit 2 is unchanged.

Each control unit 3*a*, 3*b* is configured to output a switch signal ON1, ON2 upon receipt of a time signal CLK1, CLK2 in order to apply the input voltage VIN to the assigned voltage input 4*a*, 4*b*, and to reset the switch signal ON1, ON2 upon receipt of a reset signal RESET1, RESET2. At this point, the respective control unit 3*a*, 3*b* does not differ from the related art. Additionally, each control unit 3*a*, 3*b* is designed to receive the switch signal ON1, ON2 of the respective other control unit and, upon receipt, to reset a permission signal M1, M2. Each control unit 3*a*, 3*b* outputs the switch signal ON1, ON2 only if the permission signal M1, M2 is reset. In addition, each control unit 3*a*, 3*b* also provides the permission signal M1, M2 when the switch signal ON1, ON2 is output. The permission signal M1, M2 is only used within the respective control unit and is not output.

Through this design, it is achieved that a switch signal ON1, ON2 is output only if the switch signal ON1, ON2 of the other control unit 3*a*, 3*b* has previously been received. In other words, it is ensured that a first switch signal ON1 of a first control unit 3*a* and a second switch signal ON2 of a second control unit 3*b* are always output alternately. If one of the switch signals ON1, ON2 is skipped due to a problem described above, the permission signal M1, M2 ensures that the other phase is also not switched. In this way, a drop in the coil current into the negative can in particular be avoided.

This principle can be extended to more than two phases. In this case, it must always be ensured that a control unit 3*a*, 3*b* receives the switch signal ON1, ON2 of the other control unit 3*a*, 3*b* that controls the preceding phase. In this way, an order is defined in which the individual phases are to be switched. If a phase is skipped, the control units 3*a*, 3*b* ensure that all other phases are also skipped until the causally skipped phase is to be switched again due to the respective time signal CLK1, CLK2.

Each control unit 3*a*, 3*b* comprises a first D flip-flop 7*a*, 7*b* and a second D flip-flop 8*a*, 8*b*. The first D flip-flop 7*a*, 7*b* is designed to receive the time signal CLK1, CLK2 at a dynamic input. If the time signal is received, the first D flip-flop 7*a*, 7*b* is used to provide the switch signal ON1 at an output.

The first D flip-flop 7*a*, 7*b* also comprises a reset input 9*a*, 9*b* to which a resetting signal R1, R2 is outputtable. In contrast to the related art, this resetting signal R1, R2 is not the reset signal RESET1, RESET2 but is generated by additional logic. The resetting signal R1, R2 is provided by an OR gate 10*a*, 10*b*, wherein the reset signal RESET1, RESET2 and an output of a NOR gate 11*a*, 11*b* are transmittable as inputs to the OR gate 10*a*, 10. The switch signal ON1, ON2 and the inverted permission signal M1, M2 are transmittable as inputs to the NOR gate 11*a*, 11*b*. Due to the OR gate 10*a*, 10*b*, resetting the first D flip-flop 7*a*, 7*b* by means of the reset signal RESET1, RESET2 is possible, as in the related art. Additionally, the permission signal M1, M2 provides an extended logic, which makes possible the alternating switching of the phases described above.

A second D flip-flop 8*a*, 8*b* is provided for handling the permission signal M1, M2. The second D flip-flop 8*a*, 8*b* is designed to provide the permission signal M1, M2 upon receipt of the switch signal ON1, ON2 and to reset the permission signal M1, M2 upon receipt of the switch signal ON1, ON2 from the other control unit 3*a*, 3*b*. Each control unit 3*a*, 3*b* is therefore designed to apply their (own) switch signal ON1, ON2 to a dynamic input of the second D flip-flop 8*a*, 8*b* and the switch signal ON1, ON2 of the other control unit 3*a*, 3*b* to a reset input 12*a*, 12*b* of the second D flip-flop 8*a*, 8*b*. Logical 1 is permanently applied to the respective data inputs of the first D flip-flop 7*a*, 7*b* and/or of the second D flip-flop 8*a*, 8*b*.

Preferably, a buffer 13*a*, 13*b* is arranged between the dynamic input of the second D flip-flop 8*a*, 8*b* and the output of the first D flip-flop 7*a*, 7*b* in order to transmit the switch signal ON1, ON2 to the second D flip-flop 7*a*, 7*b* in a delayed manner. This reduces a risk of unstable behavior of the conversion unit 1.

Figure 3:
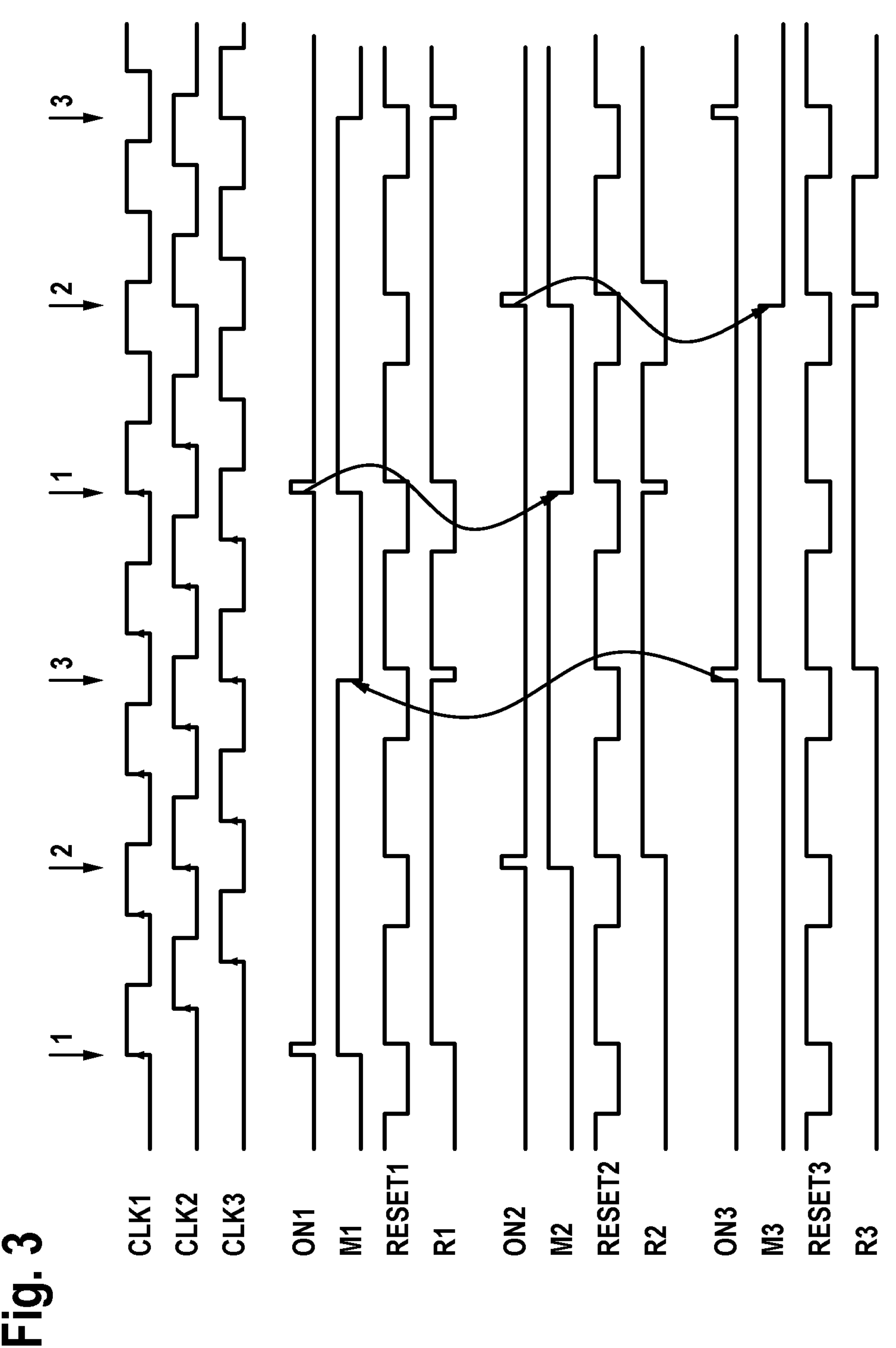
FIG. 3 shows a schematic representation of various signals during operation of the conversion unit according to the exemplary embodiment of the present invention.

The resulting functionality of the control units is shown schematically in FIG. 3. FIG. 3 schematically shows a representation of various signals during operation of the conversion unit 1 according to the exemplary embodiment of the present invention, wherein a third phase is present for better understanding. This means that the conversion unit 1 comprises three control units 3*a*, 3*b* and three voltage inputs 4*a*, 4*b* as described above.

FIG. 3 shows the respective time signals CLK1, CLK2 and CLK3 in a first row. They are used to give a switching command to the individual phases of the step-down converter circuit 2. The switching of the phases is carried out by the respectively assigned control unit 3*a*, 3*b* by means of the switch signal ON1, ON2, ON3. It is provided that the phases are to be switched sequentially in ascending numbering, i.e., first the first phase, then the second phase, then the third phase, and then again restarting with the first phase.

In a second row, FIG. 3 shows the relevant signals of the first control unit 3*a*, the relevant signals of the second control unit 3*b* in a second row, and the relevant signals of a third control unit (not shown) in a third row. The relevant signals are the switch signal ON1, ON2, ON3, the permission signal M1, M2, M3, the reset signal RESET1, RESET2, RESET3, and the resetting signal R1, R2, R3.

Initially, all permission signals M1, M2, M3 are reset. If the first time signal CLK1 is present, i.e., the corresponding curve in FIG. 3 shows logical 1, the D flip-flop 7*a* of the first control unit 3*a* provides the first switch signal ON1, and switching takes place by step-down converter circuit 2, in particular the first input switch unit 5*a* and the first reference switch unit 6*a*. At the same time, due to the second D flip-flop 8*a* of the first control unit 3*a*, the switch signal ON1 is received and, as a result, the first permission signal M1 is provided, which is shown by the rising edge in FIG. 3. The first reset signal RESET1 received by the step-down converter circuit 2 resets the first switch signal ON1 since, due to the first OR gate 10*a*, the first reset signal RESET1 causes the first resetting signal R1, which is applied to the reset input 9*a* of the first D flip-flop 7*a* of the first control unit 3*a*.

As a result of resetting the first switch signal ON1, the first switch signal is no longer applied to the input of the first NOR gate 11*a*. Furthermore, the inverted first permission signal M1 is applied to the input of the first NOR gate 11*a*, whereby the inputs of the first NOR gate 11*a* are each logical 0 so that an output of the first NOR gate 11*a* is logical 1. Due to the first OR gate 10*a*, the first resetting signal R1 is thus always provided, even if the first reset signal RESET1 is reset again. As a result, logical 1 is applied to the reset input 9*a* of the first D flip-flop 7*a* of the first control unit 3*a*, and outputting of the first switch signal ON1 is prevented independently of the first time signal CLK1.

The first phase is to always be switched after the third phase. Therefore, the third switch signal ON3 is applicable to a reset input 12*a* of the second D flip-flop 8*a* of the first switch unit 3*a*. As shown in FIG. 3, when the third switch signal ON3 is present, the first permission signal M1 is reset. The first resetting signal R1 is thus equal to the first reset signal RESET1.

It is shown in FIG. 3 that the first switch signal ON1 is output as soon as the first time signal CLK1 is present on one hand and the first reset signal RESET1, and thus the first resetting signal R1, is reset on the other hand. Through the first switch signal ON1, the first permission signal M1 is simultaneously also provided again, and the process described above is repeated.

The same principle also applies to the other phases. As shown in FIG. 3, the first switch signal ON1 causes a reset of the second permission signal M2. Likewise, the second switch signal ON2 causes a reset of the third permission signal M3. In this case, the functional principles of the control units 3*a*, 3*b* are identical; only the corresponding switch signal ON1, ON2, ON3 of the preceding phase is to be applied to the reset input 12*a*, 12*b* of the second D flip-flop 8*a*, 8*b* of the respective switch unit 3*a*, 3*b*. If the switching of a phase is skipped, no switch signal ON1, ON2, ON3 is output, and the permission signal M1, M2, M3 for the subsequent phases is thus also not reset. Switching of the subsequent phases is thus also prevented until the originally skipped phase is first switched again. The specified order for switching the phases is thus reliably maintained.

Figure 4:
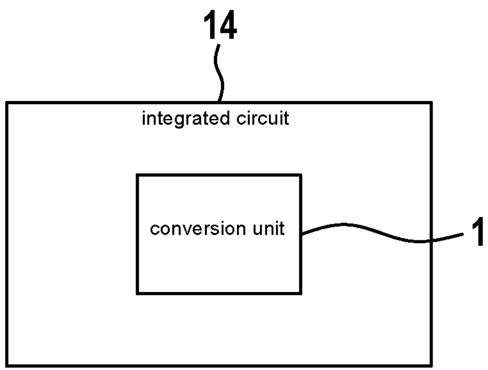
FIG. 4 shows a schematic view of an integrated circuit with a conversion unit according to the exemplary embodiment of the present invention.

FIG. 4 schematically shows an integrated circuit 14 according to an exemplary embodiment of the present invention. The integrated circuit 14 is in particular used to control driver assistance systems of vehicles and comprises a conversion unit 1 according to the exemplary embodiment of the present invention.

What is claimed is:

1. A conversion unit configured to decrease an input voltage into an output voltage, comprising:
- a step-down converter circuit with at least two voltage inputs for the input voltage; and
- at least two control units, wherein each of the control units is assigned to a voltage input, and wherein each of the control units is configured to:
  - output a switch signal upon receipt of a time signal in order to apply the input voltage to the assigned voltage input, and reset the switch signal upon receipt of a reset signal,
  - receive the switch signal of another control unit and, upon receipt of the switch signal of the another control unit, to reset a permission signal,
  - output the switch signal only if the permission signal is reset, and
  - provide the permission signal when the switch signal is output.

2. The conversion unit according to claim 1, wherein each control unit is configured to use the switch signal to cause an input switch unit to apply the input voltage to the assigned voltage input.

3. The conversion unit according to claim 1, wherein each of the control units is configured to use an inverted switch signal to cause a reference switch unit to apply a reference voltage to the assigned voltage input.

4. The conversion unit according to claim 1, wherein each control unit of the at least two control units includes a first D flip-flop and a second D flip-flop, wherein the first D flip-flop is configured to output the switch signal upon receipt of the time signal at a dynamic input of the control unit, and wherein the second D flip-flop is configured to provide the permission signal upon receipt of the switch signal and to reset the permission signal upon receipt of the switch signal from the another control unit.

5. The conversion unit according to claim 4, wherein:
- the first D flip-flop includes a reset input to which a resetting signal is outputtable,
- the resetting signal is providable by an OR gate,
- the reset signal and an output of a NOR gate are transmittable as inputs to the OR gate, and
- the switch signal and an inverted permission signal are transmittable as inputs to the NOR gate.

6. The conversion unit according to claim 4, wherein the second D flip-flop includes a reset input to which the switch signal of the other control unit is appliable.

7. The conversion unit according to claim 4, wherein each control unit of the at least two control units is configured to apply the switch signal to a dynamic input of the second D flip-flop of the control unit.

8. The conversion unit according to claim 4, wherein respective data inputs of the first D flip-flop and/or of the second D flip-flop are logical 1.

9. The conversion unit according to claim 4, wherein a buffer is arranged between the second D flip-flop and the first D flip-flop in order to transmit the switch signal in a delayed manner.

10. An integrated circuit, comprising:
- a conversion unit configured to decrease an input voltage into an output voltage, including:
  - a step-down converter circuit with at least two voltage inputs for the input voltage; and
  - at least two control units, wherein each of the control units is assigned to a voltage input, and wherein each of the control units is configured to:
    - output a switch signal upon receipt of a time signal in order to apply the input voltage to the assigned voltage input, and reset the switch signal upon receipt of a reset signal,
    - receive the switch signal of another control unit and, upon receipt of the switch signal of the another control unit, to reset a permission signal,
    - output the switch signal only if the permission signal is reset, and
    - provide the permission signal when the switch signal is output.

* * * * *